United States Patent [19]

Hashimoto et al.

[11] Patent Number: 4,707,794

[45] Date of Patent: Nov. 17, 1987

[54] PLAYBACK OPERATION CIRCUIT IN SYNTHETIC-SPEECH CALCULATOR

[75] Inventors: Shintaro Hashimoto, Ikoma; Sigeaki Masuzawa, Nara; Hisao Kunita, Yamatokoriyama; Tomohiro Inoue, Nara; Kosuke Nishimura, Yamatokoriyama, all of Japan

[73] Assignee: Sharp Kabushiki Kaisha, Osaka, Japan

[21] Appl. No.: 353,092

[22] Filed: Mar. 1, 1982

Related U.S. Application Data

[63] Continuation of Ser. No. 130,055, Mar. 13, 1980, abandoned.

[30] Foreign Application Priority Data

Mar. 13, 1979 [JP] Japan .................................. 54-29487
Mar. 16, 1979 [JP] Japan .................................. 54-32156

[51] Int. Cl.[4] .............................................. G10L 5/00
[52] U.S. Cl. ................................. 364/513.5; 364/740
[58] Field of Search .......................... 179/1 SM, 1 SG; 364/740, 706, 710, 737, 200, 900, 419; 371/25, 69; 381/51, 53

[56] References Cited

U.S. PATENT DOCUMENTS

3,846,626 11/1974 Yoshida ................................. 364/740
4,060,848 11/1977 Hyatt ..................................... 364/200
4,185,169 1/1980 Tanimoto ........................ 179/1 S M
4,225,932 9/1980 Hirano et al. ........................ 364/710

Primary Examiner—E. S. Matt Kemeny
Attorney, Agent, or Firm—Birch, Stewart, Kolasch & Birch

[57] ABSTRACT

A synthetic-speech calculator includes a calculating circuit inclusive of a plurality of memory locations to allow successive or chain calculations by some calculations equations and calculating numerical data, and voice synthesizer for providing pronunciation of selected calculating information. The calculator further comprises a first circuit for loading the some calculation equations and the calculating numerical data to the selected memory locations, a second circuit for indicating or pronouncing the some calculation equations and the calculating numerical data which have been utilized for the calculation and stored in the memory locations, and a third circuit for repeating the calculation by the some calculation equations and the calculating numerical data all stored in the memory locations.

7 Claims, 13 Drawing Figures

| Key Operation | DISPLAY | | VOICE |
|---|---|---|---|
| | DSP 2 | DSP 1 | |
| 1 | 0 0 0 | 1 | イチ |
| 2 | 0 0 0 | 1 2 | ニイ |
| 3 | 0 0 0 | 1 2 3 | サン |
| 4 | 0 0 0 | 1 2 3 4 | ヨン |
| + | 0 0 1 | 1 2 3 4 | プラス (タス) |
| 5 | 0 0 1 | 5 | ゴ |
| 6 | 0 0 1 | 5 6 | ロク |
| 4 | 0 0 1 | 5 6 4 | ヨン |
| + | 0 0 2 | 5 6 4 | プラス (タス) |
| | 0 0 2 | 5 6 4 | |
| ⋮ | ⋮ | ⋮ | ⋮ |
| 7 | 0 0 8 | 7 | ナナ |
| 0 | 0 0 8 | 7 0 | ゼロ |
| − | 0 0 9 | 7 0 | マイナス (ヒク) |
| | 0 0 9 | 7 0 | |
| 9 | 0 0 9 | 9 | キュ |
| 0 | 0 0 9 | 9 0 | ゼロ |
| = | 0 1 0 | 9 0 | イコール (ワ) |
| | 0 1 0 | 3 3 4 7 | サンゼンサンビャクヨンジウイチデス |

FIG. 7

| mode | Key Operation | DISPLAY | | VOICE |
|---|---|---|---|---|
| | | DSP 2 | DSP 1 | |
| PB (AUTO) ACUM (Normal) | PBK | 0 0 0 | | |
| | | 0 0 1 | 1 2 3 4 | センニヒャク サンジュウ ヨン プラス |
| | | 0 0 2 | 5 6 4 | ゴヒャク ロク ジュウ ヨン プラス |
| | | 0 0 2 | 1 5 6 4 | |
| | | ⋮ | ⋮ | ⋮ |
| | | 0 0 8 | 7 0 | ナナ ジュウ マイナス |
| | | 0 0 9 | 7 0 | |
| | | 0 0 9 | 9 0 | キュウ ジュウ イコール |
| | | 0 1 0 | 3 3 4 7 | サンゼン サンビャク ヨンジュウ ナナ デス |

FIG.8

| mode | Key Operation | DISPLAY | | VOICE |
|---|---|---|---|---|
| | | DSP 2 | DSP 1 | |
| PB (ST) ACUM (Normal) ((ST ACUM)) | PBK | 0 0 0 | | |
| | | 0 0 1 | 1 2 3 4 | センニヒャク サンジュウ ヨン プラス |
| | PBK | 0 0 1 | 5 6 4 | ゴヒャクロクジュウヨン プラス |
| | | 0 0 2 | (1 7 9 8) | |
| | | ⋮ | ⋮ | ⋮ |
| | PBK | 0 0 8 | 7 0 | ナナ ジュウ マイナス |
| | | 0 0 9 | (3 4 3 7) | |
| | PBK | 0 0 9 | 9 0 | キュウ ジュウ イコール |
| | | 0 1 0 | (3 3 4 7) | |

PLAYBACK OPERATION CIRCUIT IN SYNTHETIC-SPEECH CALCULATOR

This application is a continuation of copending application Ser. No. 130,055, filed on Mar. 13, 1980, now abandoned.

BACKGROUND OF THE INVENTION

The present invention relates to a synthetic-speech calculator and, more particularly, to a playback operation circuit for a synthetic-speech calculator wherein calculation equations and numerical data are audibly generated by a voice synthesizer after the completion of the calculation.

An example of synthetic-speech calculators was disclosed in A. TANIMOTO et al. U.S. Pat. No. 4,179,584 issued Dec. 18, 1979, entitled "SYNTHETIC-SPEECH CALCULATORS" assigned to the present assignee. For those synthetic-speech calculators, it is desirable that a playback operation means be adapted to the calculators for providing an audible sound of calculation data such as one or more calculation equations and calculation numerical data to assist in the confirmation of the introduction of them.

SUMMARY OF THE INVENTION

Accordingly, it is the primary object of the present invention to provide an improved synthetic-speech calculator.

It is a further object of the present invention to provide a playback operation means adapted to a synthetic-speech calculator for providing sound information of calculation data such as a selected calculation equation and calculation numerical data.

It is a further object of the present invention to provide an improved memory means useful for a synthetic-speech calculator for memorizing calculation data such as a selected calculation equation and calculation numerical data even after the completion of the calculation, with the object that the calculation data so memorized be pronounced by a playback operation means, thereafter.

It is a further object of the present invention to provide a calculation repeat means applied to a synthetic-speech calculator for repeating calculation of calculation data such as a selected calculation equation and calculation numerical data which are memorized by a memory means after the completion of the calculation once.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a synthetic-speech calculator includes a calculating circuit inclusive of a plurality of memory locations to allow successive or chain calculations by some calculation equations and calculating numerical data, and a voice synthesizer for providing pronunciation of selected calculating information. The calculator further comprises means for loading the calculation equations and the calculating numerical data into selected memory locations, means for indicating or pronouncing the calculation equations and the calculating material data which have been utilized for the calculation and stored in the memory locations, and means for repeating the calculation using the calculation equations and the calculating numerical data all stored in the memory locations.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
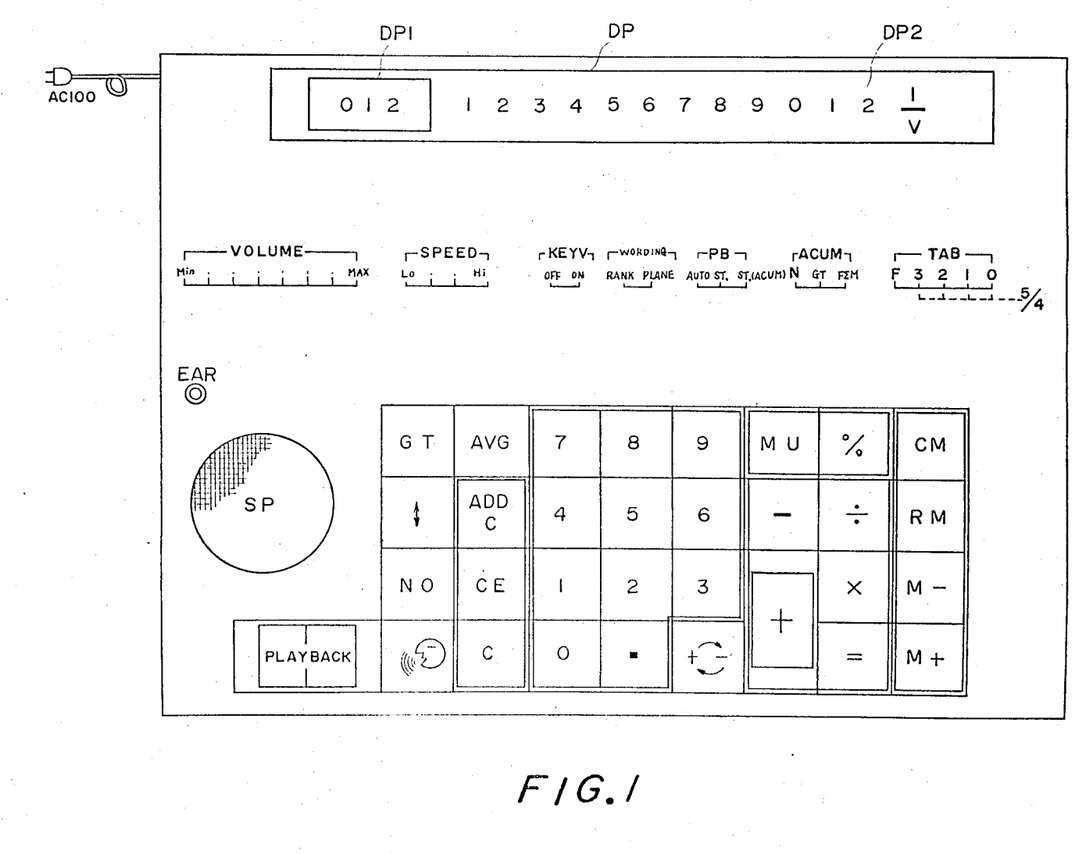
FIG. 1 is a plane view of a synthetic-speech calculator of the present invention.

With reference to FIG. 1, a synthetic-speech calculator of the present invention contains a display DP, a mode selection unit, and a keyboard unit on the front frame of it.

Display DP

The display DP comprises a data indication DP1 and a calculation indication DP2. The data indication DP1 shows data entered by the keyboard unit and calculated data obtained in terms of one or more calculation equations. The calculation indication DP2 indicates one or more calculation equations which are used, or alternatively the number of calculating or calculated data which are used.

Mode Selection Unit

The mode selection unit contains a volume selection unit, a speed selection unit, a key.V selection unit, a wording selection unit, a "PB" selection unit, an "ACUM" unit, and a "TAB" selection unit as indicated by the respective symbols.

The volume selection unit is selected to control the volume of the sound of voices in a certain degree between Min. and Max. The speed selection unit is selected to adjust a speed of the sound of voices in a certain amount between a low and a high levels. The Key.V selection unit is turned on and off so as to select whether the sound of voices is generated or not.

The wording selection unit is selected in the sound of voices mode between "PLANE" mode and "RANK"

mode. In the "PLANE" mode, the sound of voices is successively provided in such a manner that each of the number of digits indicated in the data indication DP1 is individually punctuated as in the case where "123" is pronounced as "one", "two", and "three" or their corresponding another different language such as Japanese or German. In the "RANK" mode, on the other hand, the sound of voices is successively generated in such a manner that the number of the digits shown in the data indication DP1 is announced by giving the relative position of a figure in a group as in the case where "123" is pronounced as one hundred and twenty-three or their corresponding another different language such as Japanese or German.

The "PB" selection unit is selected among "AUTO", "ST", and "ST.(ACUM)" modes. In the "AUTO" mode, some calculation equations and calculation data are all memorized in a memory and are successively developed in an automatic control. In the "ST" mode, they are generated successively in response to each actuation of a "PLAYBACK" key switch as mentioned below. In the "ST.(ACUM)" mode, they are developed successively only in an "ACUM" mode in response to each of the actuation of the "PLAYBACK" key switch.

The "ACUM" unit functions to select a kind of calculation mode among a normal calculation mode "N", a sum calculation mode "GT" which is allowed to calculate a sum of results obtained by some calculation equations, and a first factor sum mode "FΣM" wherein a sum of two or more "first factor" numbers in two or more calculation equations is calculated. The "TAB" selection unit is provided to enable the selection of the position of a decimal point.

Keyboard Unit

The keyboard unit comprises ten numerical key switches, function key switches, a clear entry key switch "CE", a clear key switch "C", and some additional key switches according to the present invention.

The ten numerical key switches are actuated to provide decimal numerals 0, 1, 2, 3, . . . 9. A decimal point key switch is allotted for a decimal point. The function key switches are actuated for specifying four arithmetic operations of addition, subtraction, multiplication and division as denoted by the symbols "+", "−", "×" and "÷". An equal key switch "=" is provided for generating information for equality. Some memory-oriented key switches "M+", "M−", "CM" and "RM" are provided for causing respective memory operations as is well-known in the art. A percent key switch "%", a sign changing key switch "+⊃−", and a mark up key switch "MU" are provided.

Some additional key switches comprise key switches labeled respectively as "AVG", "GT", "ADD/C", " ", "NO", "⟨⟩", and "PLAYBACK".

The "AVG" key switch functions to determine a mean value of some calculated results. The "GT" key switch acts to calculate a sum of some calculated results.

The "ADD/C" key switch serves as a correction key switch for allowing cancellation of numeral data and function operation information which are applied immediately before the actuation of this key switch. When the calculation is completed in succession so that some kinds of calculated results are obtained, the actuation of the "ADD/C" key switch enables that the numeral data and the function operation information just preceding the actuation of this key switch be canceled by repeating the calculation.

The "↕" key switch is operated to exchange the contents of X and Y registers with respect to each other. The "NO" key switch is a memory address selection key for directing, in combination with the ten numerical key switches, an address in the memory from which a playback operation is performed in response to the actuation of the "PLAYBACK" key switch. The "⟨⟩" key switch is actuated to allow the pronounciation of data shown in the data indication DP1. The "PLAYBACK" (abbreviated to "PBK" hereinafter) key switch is a key switch for directing a playback operation as called for herein wherein one or more calculation equations and numerical data all entered by the keyboard unit are again indicated in the display DP and, if desired, are pronounced by the synthetic-speech calculator.

In addition to the display DP, the mode selection unit, and the keyboard unit as described, there are further provided a speaker SP for providing the sound of voices and an earphone terminal to be connectable to an earphone for providing the sound of voices.

Figure 2:
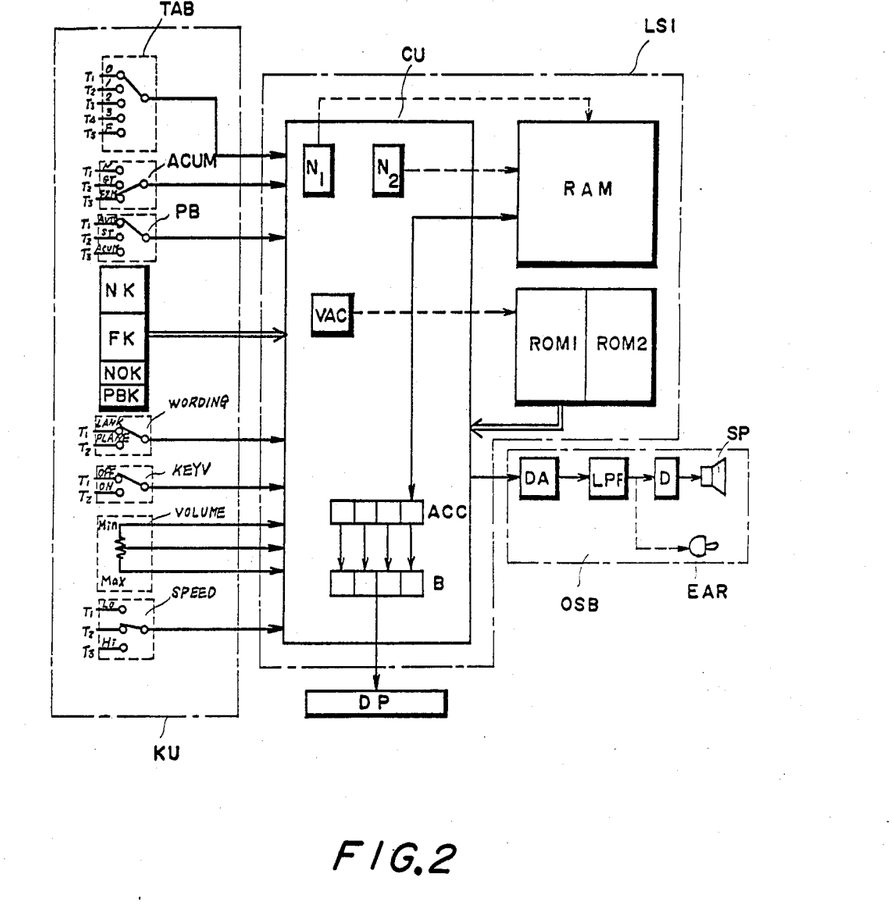
FIG. 2 is a block diagram of a circuit incorporated within the calculator shown in FIG. 2.

FIG. 2 is a block diagram of a circuit incorporated within the calculator shown in FIG. 1. The circuit mainly comprises the keyboard unit KU, a control unit CU, an ROM unit, an RAM unit, a voice synthesizer OSB, and the display DP.

The keyboard unit KU and the display DP are identical to the sames shown in FIG. 1. The RAM unit serves as a register and the ROM unit functions to memorize a variety of microprogramming instructions. The control unit CU performs data processing operations. The RAM unit, the ROM unit and the control unit CU are all composed of one or more large scale integrated semiconductor chips (LSI). The RAM unit contains a random access memory (RAM), and the ROM unit comprises two read only memories (ROMs) of ROM 1 and ROM 2.

The control unit CU comprises two counters N1 and N2, an address counter VAC, an accumulator ACC, and a buffer register B. The first counter N1 is operated so as to direct a column address of the RAM unit and the second counter N2 is operated so as to select a row address. The address counter VAC directs an address of the ROM unit. The voice synthesizer OSB comprises a D/A converter, a low pass filter LPF, a speaker driver D, and a speaker SP or an earphone.

According to the circuit configuration of the circuit, one of the numeral key switches of the keyboard unit KU is operated to provide specific code information entered to the accumulator ACC. By the accumulator ACC, the specific code information is stored in an address of the RAM unit. Code information memorized in the RAM unit is output to the display DP through the accumulator ACC and the buffer register B. The ROM unit memorizes, preliminarily, digital or quantum voice information covering the ten numerals 0 through 9 and the decimal point as micro-programming control information.

In order to provide the sound of voices for "one", "two" and "three" in English or another equivalent language by the voice synthesizer OSB, the address counter VAC is set in an initial address. The ROM unit contains one selected word in one or more addresses following the initial address. As a result, the ROM unit develops selected digital or quantum voice information received by the control unit CU, with the result that the sound of voices is generated under the control by the control unit CU.

In order that the place expression be introduced into the sound of the voices, the wording selection unit mentioned with reference to FIG. 1 is placed in the "RANK" mode. This kind of modification can be achieved by desirably changing the form of the quantum voice information memorized in the ROM unit.

The D/A converter serves to convert digital information into analog information. The analog information is applied to the low pass filter LPF so that it provides analog voice information. The analog voice information is admitted to the speaker SP so that specific sound of voices is developed.

Figure 3:
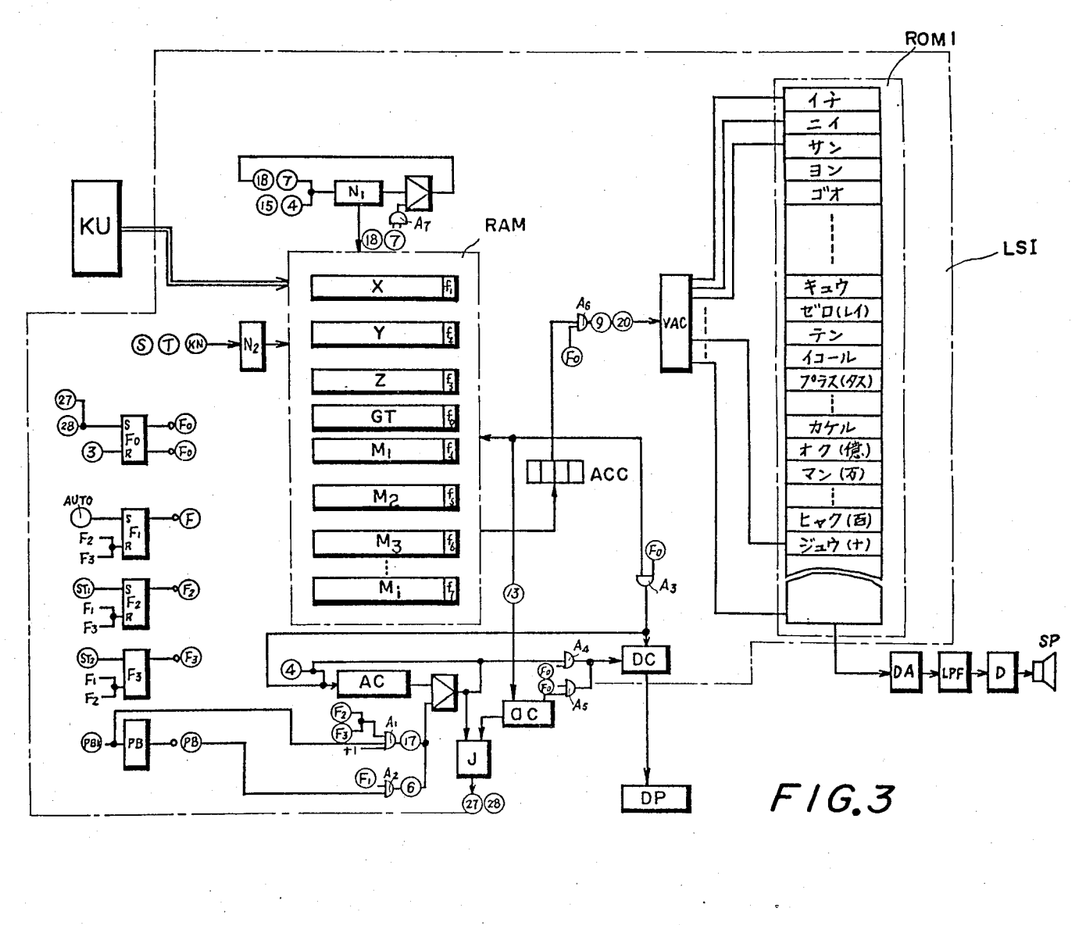
FIG. 3 is a more detailed block diagram of the circuit indicated in FIG. 2.

FIG. 3 indicates a more detailed block diagram of the circuit depicted in FIG. 2. In FIG. 3, like elements corresponding to those of FIG. 2 are indicated by like numerals.

With reference to FIG. 3, the RAM unit comprises four registers X, Y, Z and GT, and a plurality of memory registers M1 through Mi. In the respective registers, a portion denoted by fi (i=0, ... i) is a location wherein various kinds mode information is stored. Only the ROM 1 is shown while the ROM 2 is omitted. The ROM 1 stores in the form of fixed digital information various Japanese words or otherwise can store a plurality of words in another desirable language. The various Japanese words contain plenty of numerical data, some place words and some calculation function words. The various Japanese words as shown in the drawings of FIG. 3 are as follows in English.

1. numerical data
   one, two, three, four, five ... nine, zero and ten
2. calculation function words
   equal, plus, minus ... multiply, and subtract
3. place words
   one hundred million, ten thousand, one thousand, one hundred, and ten There are connected some flip flops F0, F1 to F3, and PB each of which is set in a certain mode performed in the synthetic-speech calculator. There are provided an item counter AC and a counter ac. The counter ac is provided to assist the number of operating numerals and the kind of functions. One of the numeral key switches is actuated to enter information for directing the turn of the position of one of the operating numerals in the sequence of one or more calculating equations by the same serial number as one of the numeral key switches. A detection circuit J is provided for determining the equivalency between the item counter AC and the counter ac. The indication in the display DP and sound pronunciation by the voice synthesizer OSB are both prevented until the contents of the item counter AC is consistent with that of the counter ac. In other words, the indication and the sound pronunciation are enabled only after the contents of the item counter AC are consistent with the address selected by one of the numeral key switches. There is a decoder DC connected to the item counter AC and the counter ac. A plurality of AND gates A1 through A7 are connected.

Figure 4:
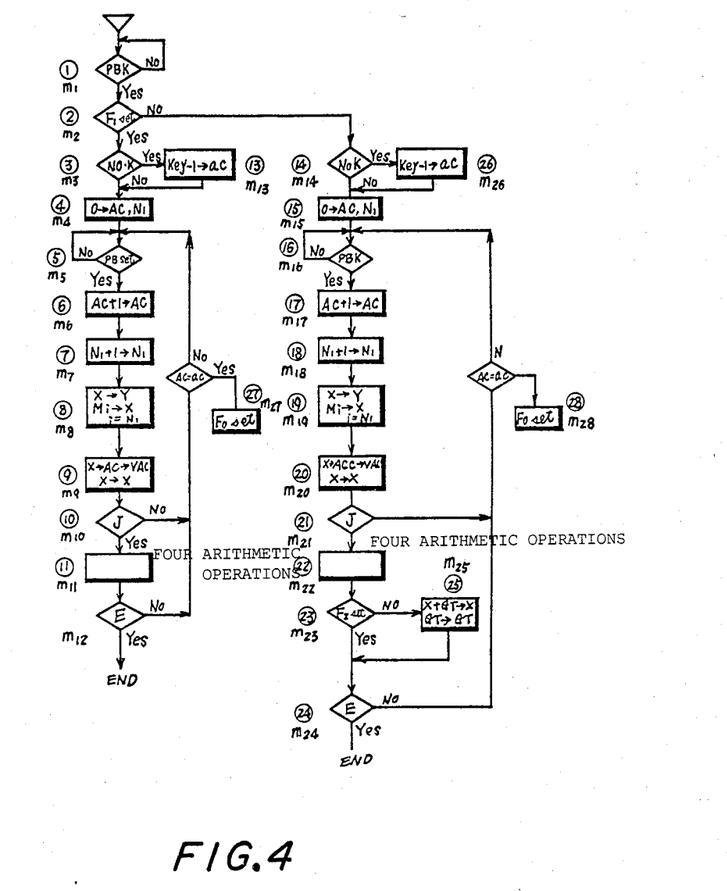
FIG. 4 is a flow chart representing operation of the circuit shown in FIG. 3.
Figure 5:
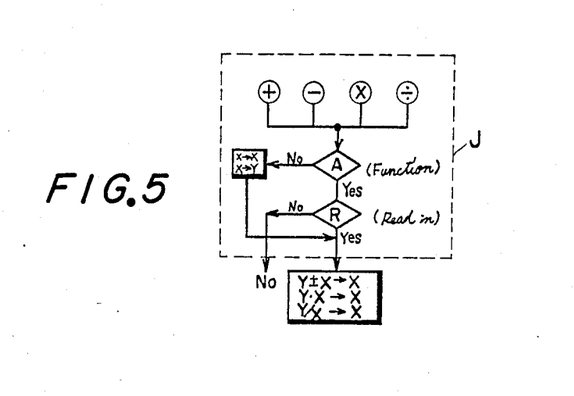
FIG. 5 is a flow chart representing operation of a determination circuit contained within the circuit shown in FIG. 3.

FIG. 4 shows a flow chart representing operation by the circuit indicated in FIG. 3. The operation of the circuit shown in FIG. 3 will be explained with reference to the flow chart of FIG. 4 in the case where the following equation is calculated in the calculator of the present invention.

Model of Calculation Equation $$1234+564+301+78+110+220+360+560+70-9-0=3,334 \quad (I)$$

Figure 6:
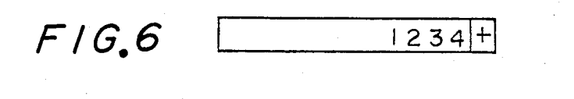
FIG. 6 shows a kind of mode in a display contained within the circuit indicated in FIG. 3.
Figure 7:
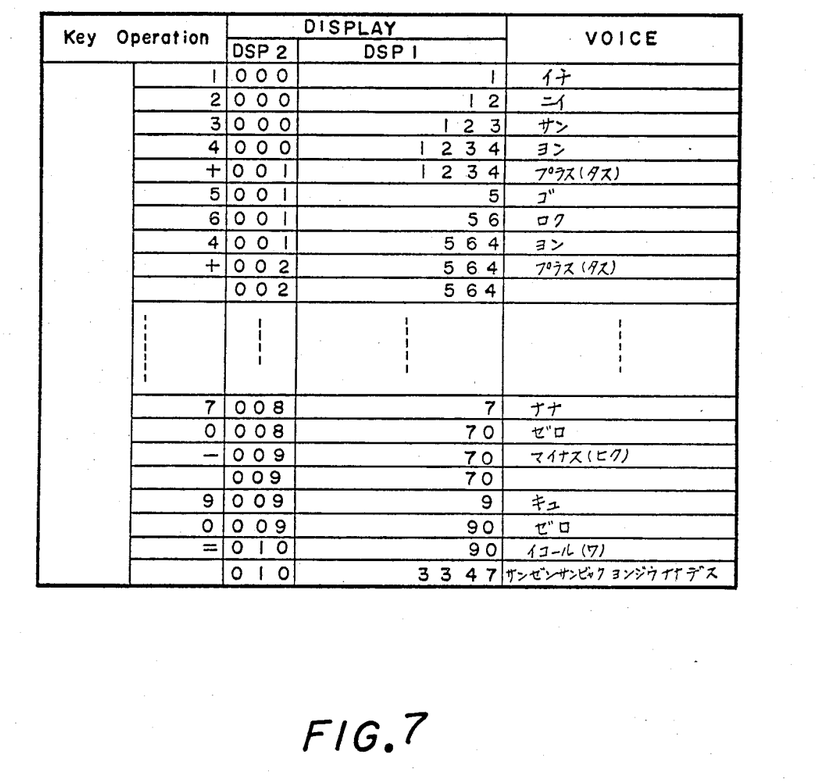
FIGS. 7 through 9 show operations of various modes in the form of a display and a voice pronunciation.

To accomplish the calculation according to the calculation equation containing many additions and one subtractions, the numeral key switches are actuated as shown in the table of FIG. 7, with the result that the indication of the display DP and the sound pronunciation by the voice synthesizer OSB are simultaneously provided concerning the numeral data and function data entered. The sound pronunciation is provided in such a manner as it reads one of the key symbols actuated. Respective code information of the numeral data and the function data is applied to the calculating registers as typically shown in FIG. 6. Each time the introduction of the respective code information is completed, it is admitted to one of the memory registers M1 through Mi shown in FIG. 3.

Figure 8:
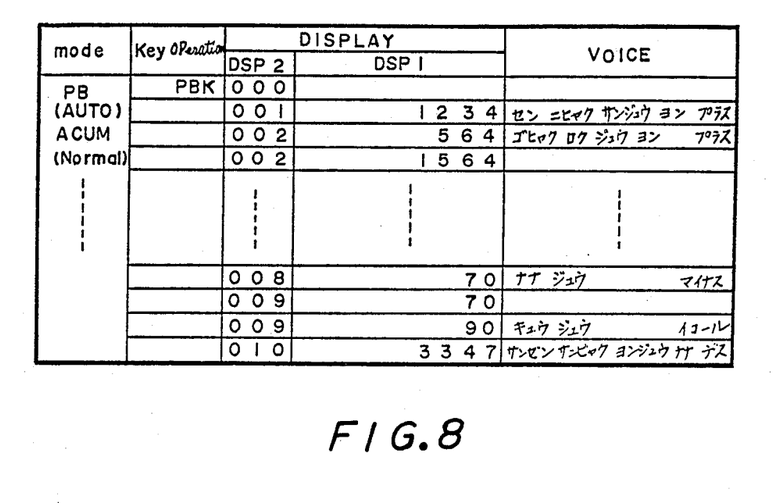
Figure 9:
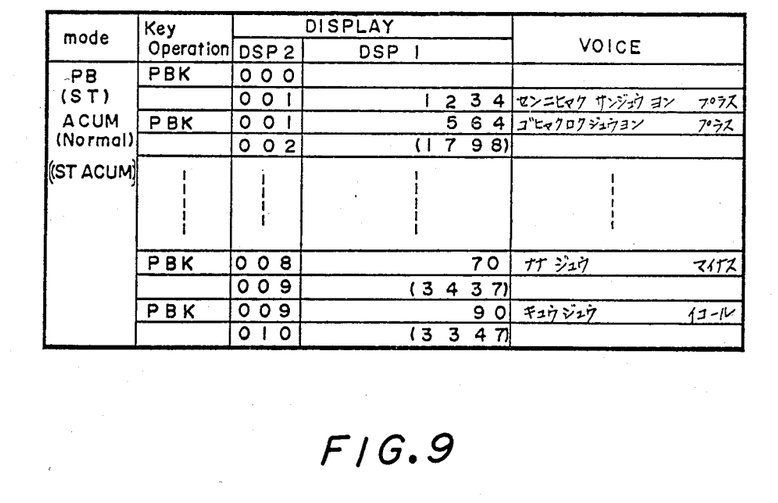

In the tables of FIGS. 7 to 9, the sound of voice is provided in the Japanese manner by the Japanese language. However, any other language can be adopted to provide the sound of voice. For assisting the understanding of the table of FIGS. 7 to 9, the voice column is wholly represented by English from the first item to the last item in all these tables.

In FIG. 7:

| Key Operation | Voice |
|---|---|
| 1 | one |
| 2 | two |
| 3 | three |
| 4 | four |
| + | plus |
| 5 | five |
| 6 | six |
| 4 | four |
| + | plus |
| . | . |
| . | . |
| . | . |
| 7 | seven |
| 0 | zero |
| − | minus |
| . | . |
| 9 | nine |
| 0 | zero |
| = | equal |
|  | thirty-three hundred and fourty-seven |

In FIG. 8:

| Key Operation | DPl | Voice |
|---|---|---|
| PLAYBACK (=PBK) | 1234 | twelve hundred and thirty-four plus |
|  | 564 | five hundred and sixty-four plus |
|  | 1564 |  |
| . | . | . |
| . | . | . |
| . | . | . |
|  | 70 | seventy minus |
|  | 70 |  |
|  | 90 | ninety equal |
|  | 3347 | thirty-three hundred and fourty-seven |

In FIG. 9:

| Key Operation | DPl |  |
|---|---|---|
| PBK |  |  |
|  | 1234 | twelve hundred and thirty-four plus |

| Key Operation | DP1 | |
| --- | --- | --- |
| PBK | 564 | five hundred and sixty-four plus |
|  | (1798) |  |
| . | . | . |
| . | . | . |
| . | . | . |
| PBK | 70 | seventy minus |
|  | (3437) |  |
| PBK | 90 | ninety equal |
|  | (3347) |  |

After the key operation and the calculating operation are completed as summarized in FIG. 9, the "PLAYBACK" (="PBK") key switch shown in FIG. 1 is supposed to be actuated under the condition that the "PB" selection unit is placed in the "AUTO" mode and the "ACUM" unit is set in the normal calculation mode "N". In such a mode, the "AUTO" mode in the "PB" selection is placed in that the calculation equation and numerical data both memorized in the memory are successively generated and, in addition, the normal calculation mode "N" in the "ACUM" unit is placed in that the numerical data thus generated are calculated according to the calculation equation thus generated.

Operation in such a mode will be described with reference to FIGS. 3 and 4 as follows:

When the "PB" selection unit is placed in the "AUTO" mode, the flip flop F1 is turned set. In such a condition, the "PBK" key switch is operated so that the flip flop PB is then turned set. The set conditions of the two flip flops PB and F1 make the AND gate A1 conductive, with the result that calculation steps m1 through m8 of the flow chart of FIG. 4 are executed. In step m3, as the "NO" key switch as a key for selecting a memory address is not actuated, the following step m4 is selected. In step m5, the set condition of the flip flop PB is detected. In steps m6 and m7, the counter AC and N1 are both advanced by one. In step m8, in terms of micro order ⑦ produced in step m7, the X register receives the contents of a selected memory portion among some registers of the RAM unit. The selected memory portion is, in this instance, identical to the register M1 as the "NO" key switch is not operated. The contents of the X register are transferred to the Y register. Steps m3→m13→m3 will be explained below.

In step m9, the contents of the M1 register presently applied to the X register selects a train of digital voice information of the memory ROM 1 with the help of the address counter VAC. The train of digital voice information is applied to the D/A converter, the low pass filter LPF, the speaker driver D, and the speaker, so that the sound of voices are developed. In step m10, a detection J is made whether under the condition that the first function instruction such as one selected from the addition, the subtraction, the multiplication, and the division is present, the second function instruction, e.g., equal is present to provide A $\boxed{\times}$ $\boxed{=}$, or not and further introduction of the numeral data is present to provide A $\boxed{\times}$ B, or not.

In the calculation equation (I), when the introduction of "1234+" is completed, step m10 proceeds to step m5. Then steps m5 through m10 are repeated. When the introduction of "1234+564" ends, the detection J recognizes that another combination of the numerical data, "564" is applied after the introduction of the first instruction "+". It causes the addition to be conducted according to the first function instruction "+" memorized in the X register, with the result that a kind of calculation result "1798" is obtained according to "1234+564" in step m11 for the four arithmetic operations.

In step m12, the completion of a sequence of calculation is determined wherein the function data and the numerical data all entered by the keyboard unit are stored in a memory register and simultaneously end code information is subsequently transferred to the preceding memory register. In this instance, the sequence of calculation is not completed so that step m12 advances to step m5. In step m5, the set condition of the flip flop PB by the actuation of the PBK key switch is determined. Once the PBK key switch is operated, the PBK key switch is repeatedly actuated so that the flip flop PB is turned reset, with the result that further operation is prevented. Further actuation of the PBK key switch is conducted so that the flip flop PB is turned set to thereby select step m6. This means that the playback operation is temporarily prevented. For this purpose, the PB flip flop may be composed of a T-type flip flop.

Steps m6 to m12 are executed until a calculation is completed by the operating data stored in the memory register m10 containing end code information. In this instance, the memory register M10 stores a kind of operating data, "ninety" and function instruction "=". In step m12, the calculation up to the memory register M10, namely, "1234+564+301+78+110+220+360+500+70−90−", is determined to be terminated. This accomplishes the playback operation. The playback operation is carried out in such a manner as shown in FIG. 8, by the indication in the display DP and the sound of voices by the voice synthesizer OSB.

In terms of the specific form of the present invention as above described, intermediate calculation results are not pronounced nor displayed. It will be apparent that the intermediate calculation results can be pronounced or indicated in the same manner as in the case with the calculation final results and the respective numerical data.

Furthermore, another type of playback operation will be described wherein each step executing one function instruction to a group of calculating numerical data is caused by the playback, with reference to FIGS. 3, 4 and 9.

The "PB" selection unit is placed in the "ST" mode in which case the calculation equations and the groups of the calculating numeral data are developed each time the "PBK" key switch is actuated. In the "ST" mode, the flip flops F1 and F3 are placed in reset conditions and the flip flop F2 is turned set. Therefore, the following steps are executed.

m1→m2→m14→m15→m16→m17→m18→m19→m20→m21→m22→m23→m24

Steps m15 through m24 are executed to provide the same operation as steps m4 through m12 mentioned above. Each time the "PBK" key switch is actuated, step m16 is executed to detect the actuation with the result that, as in the case with the "AUTO" mode, the calculation defined by the calculation equation (I) is performed by the calculating numerical data and calculating function data all stored in the memory register M1 through M10. As in the case with the "AUTO" mode, the intermediate calculation results are not pronounced nor indicated.

The "ST.(ACUM)" mode in the "PB" selection unit places in the condition that the flip flops F1 and F2 are reset and the flip flop F3 is set. As shown in FIG. 4, each time the "PBK" key switch is operated, step m25 is executed so that the intermediate calculation results are indicated. In FIG. 9, the intermediate calculation results are represented within parenthesis in the data indication DP1. In steps m3 and m14, a detection is made whether, in the playback operation, an address from which the calculation is repeated is selected by the combination of the "NO" key switch and one of the numerical key switches. For instance, in the calculation equation (I), it is assumed that there is a desire for confirming the calculation following the calculating numerical data "110" in connection with some calculating numerical data and function instructions. For this purpose, the "NO" key switch is operated so that the serial number for this group of numerical data in this sequence of the calculation equation is entered by the number of one of the numerical key switches. Now, "110" is the fifth in the equation (I) and so "5" numerical key switch is actuated. The serial number entered by this key switch is applied to the ac counter.

In steps m13 and m26, "key" in FIG. 4 represents the number of one numeral key switch for directing the serial number. Information obtained by "key-1" is introduced into the ac counter. The subtraction of the number of the serial number by one is resulted from the condition that, in step m6, "AC+1→AC" is established.

Under this condition, the playback operation is carried out as mentioned above. If the contents of the item counter AC is not consistent with that of the ac counter, the indication and the sound of voices concerning the calculating numerical data and the function instructions are prohibited.

In a calculating circuit of the calculator, the calculation equation (I) is carried out from the beginning. When the contents of the item counter AC becomes consistent with that of the ac counter, micro orders ㉗ and ㉘ are generated to place the flip flop F0 to be turned set. The set conditions of the flip flop F0 permits the AND gates A3 and A4 to become conductive. The information stored in the item counter AC and the X register is indicated in the display DP. In addition, the calculating numerical data and the calculating functions subsequently accessed from the memory registers Mi to the X register are pronounced.

In the flow chart of FIG. 4, the processing of the registers of the RAM unit are within the knowledge in the art. And so further description is omitted.

About the data indication DP1 and the calculation indication DP2, the former is identical to an ordinary display of a calculator and the latter shows the contents of one or more memory registers used for the calculation on the basis of the contents of the item counter AC. When the "ACUM" mode selection unit is placed in the "GT" mode and the "FΣM" mode, the item counter AC is increased by one only each time of the termination of a sequence of the calculation, namely, each of the actuation of the equal key switch "=", only in the constant calculation. And the contents of it are indicated in the calculation indication DP2.

In the "GT" mode and the "FΣM" mode, for example, the following calculation is conducted in succession.
A×B=
A×D=
E+F×G=

Since "E+F×G=" is not a constant calculation, the introduction of "E+" is detected to reset the item counter AC, otherwise to prevent the item counter AC from outputting, with the object that the contents of it are prevented from being indicated or pronounced.

The memory registers are controlled in the following manner in the automatic constant calculation:

Assuming that the following constant calculations are in succession conducted.
(i) $A \times B = C$
(ii) $D \times B = E$
(iii) $F \times B = G$
(iv) $H \times B = I$ For this purpose, the calculator is operated wherein the key switches are actuated in a manner:
(i) A ⊠ B ▭
(ii) D ▭
(iii) F ▭
(iv) H ▭

Upon each of the actuation of the equal key switch, the respective calculating results are obtained. This results from the conditions that the constant "B" is kept stored in the calculating register even after the termination of the calculation.

Furthermore, if it is desired that the synthetic-speech calculator function in the playback operation mode of the present invention and if it calculates in succession the following equations, some defaults result as follows:

Equations:
(i) $A \times B = C$
(ii) $D \times B = E$
(iii) $F \times B = G$
(iv) $H + I \times J = K$
(v) $L \times M = N$ In the conventional constant calculating calculator, the key switches are actuated and resultant calculations are conducted as follows:

| Key switch | | Calculation |
| --- | --- | --- |
| (i) | A ⊠ B ▭ | A × B = C |
| (ii) | D ▭ | D × B = E |
| (iii) | F ▭ | F × B = G |

As noted, the data information "B" is used as a constant.

However, in the synthetic-speech calculator of the present invention, the memory register contains data entered by the keyboard unit as follows:
(i) $A \times B =$
(ii) $D =$
(iii) $F =$
(iv) $H + I \times H =$
(v) $L \times M =$ Under the condition, if the playback operation is effected, the calculations, "$A \times B = C$, $D \times B = E$, and $F \times B = G$" are not available. To eliminate these defaults, the constant data, which are not in fact entered by the keyboard unit in the second calculation and the further calculations, are automatically entered to the memory register in the constant calculation.

Figure 10:
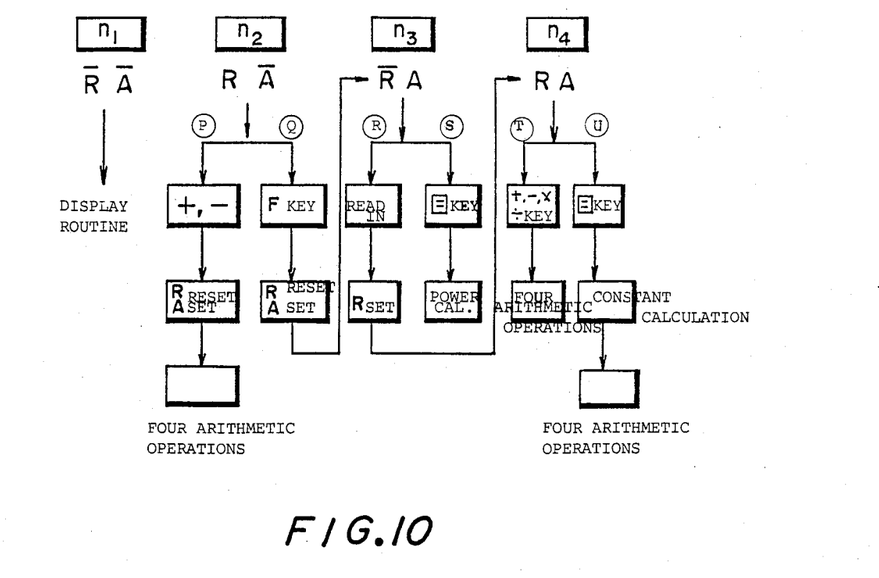
FIG. 10 shows a flow chart representing operation for a constant calculation caused in the calculator indicated in FIG. 1.

FIG. 10 shows a flow chart for conducting such an operation for the constant data information. In this flow chart, calculation steps are denoted as n1 through n4, two flip flops R and A are provided for memorizing circuit conditions. The flip flop R is set by the introduction of numerical data and reset by the actuation of one of the four function keys, "+", "−", "×", and "÷". The flip flop A is turned set by the actuation of one of the four function keys and reset by the activation of the clear key switch. The function condition defined by one of the four function keys is assumed to be memorized by another flip flop until further actuation of one of the four function keys is conducted.

With reference to the flow chart of FIG. 10. the calculation of "A+" is executed in routine Ⓟ. The calculation of "A×B×(or +,÷,−)" is performed in routines Ⓠ → Ⓡ → Ⓣ. The calculation of "$A \times B=$" is carried out in routins Ⓠ → Ⓡ → Ⓤ. The constant data information "B" as a calculating number (if desired, a calculated number) is kept in the Y register as a calculating register.

Without the actuation of one of the function key switches, the introduction of numeral data "D" enables the calculation of "Y→Y" and "D→X". Upon the actuation of the equal key, the calculation of "$D \times B=E$" is automatically executed. It is the same to the calculation of "$F \times B=G$".

The constant data information "B" is processed in "Y→Y" and "D→X" by the combination of the introduction of the numeral data following the calculation "$A \times B=$" and the equal key. Since "A×" is stored in the first memory register M1, and "B=" is in the second memory register M2, the data information of "D" and "B" (constant) are stored in the third and the fourth memory registers M3 and M4, respectively. Concerning "$F \times B=G$", upon the introduction of "F=", F→M5 and B→M6 are performed. In the constant calculation, the calculating number (or the calculated number) which is not entered by the keyboard unit is memorized in a memory register with the object that the playback operation is carried out to repeat the constant calculation.

Some features of the synthetic-speech calculator according to a preferred form of the present invention are summarized as follows:

(1) The calculator is adapted to calculate a sequence of some calculation equations with the aid of a plurality of memory locations. The sequence of some equations and the calculating data are subsequently memorized in the memory locations. Even after the calculation is completed, the equations and the data are developed and indicated in a display. A further calculation can be conducted in the calculator on the basis of the equations and the data thus developed.

(2) The equations and the data developed are pronounced.

(3) When a plurality of calculation equations are completed, the initial state prior to the execution of the plurality of calculation equations is brought out. From the initial state, the plurality of calculation equations are repeated.

(4) The calculation equations and the numerical data to be developed after the execution of the calculation are selected by one of numerical key switches.

(5) The calculation equations and the numerical data presently developed after the execution of the calculation are temporarily stopped on the way.

(6) After the stop of (5), the generation of the calculation equations and the numerical data are reopened.

(7) The display indicates the number of the sum of the calculating equations which have been calculated and are presently calculated, otherwise the number of calculating or calculated numerical data used and being used for the calculation.

(8) A constant number used for a constant calculation is memorized in a memory register without being entered by any of the numerical key switches.

(9) An address of a memory register in which data are stored for usage for the calculation is indicated together with the data themselves.

According to another form of the present invention, in the calculator for calculating the sum of calculated results in the normal calculation, when the actuation of one of key switches is conducted for the purpose of conducting an abnormal calculation, the invalidity of the sum is indicated to the operator.

Figure 11:
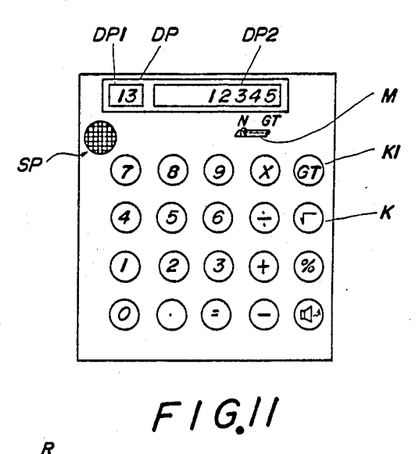
FIG. 11 is a plan view of another form of the synthetic-speech calculator according to the present invention.

FIG. 11 shows a plan view of another form of a synthetic-speech calculator according to the present invention. In FIG. 11, there are shown a display DP inclusive of a sum display DP1 and a calculating-data display DP2, a speaker SP, a plurality of key switches K, a sum key switch K1, and a mode selection switch M.

The sum display DP1 indicates a sum of calculated results obtained by some calculation equations. The calculating-data display DP2 indicates calculating data and the calculating results. The sum key switch Ki is operated to obtain a sum of some calculating results. The mode selection switch M is placed in a normal mode N, wherein a sum of some calculating results is not obtained, and a sum mode GT wherein a sum of some calculating results are obtained.

Figure 12:
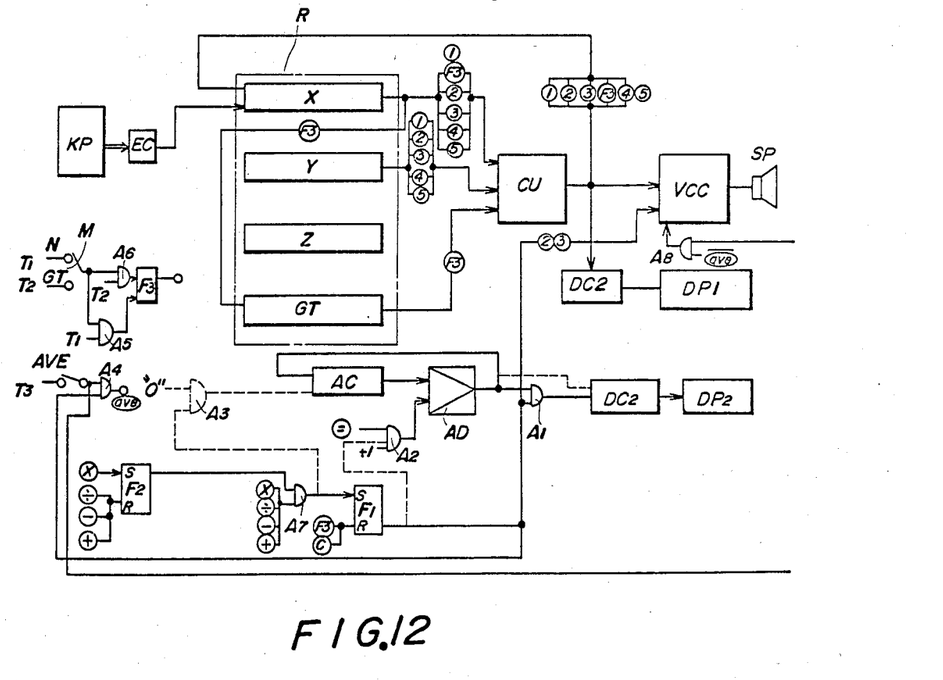
FIG. 12 is a block diagram of a circuit incorporated within the calculator represented in FIG. 11.

FIG. 12 shows a block diagram of a circuit contained within the calculator represented in FIG. 11. The circuit comprises a keyboard unit KP, an encoder EC, a register unit R containing a display and calculating register X, calculating registers Y and Z, and a sum register GT, the mode selection switch M, a calculating unit CU, a voice control circuit VCC, the speaker SP, two decoders DC1 and DC2, the two displays DP1 and DP2, a counter AC, an addition circuit AD, flip flops F1 through F3, AND gates A1 through A6, an average key AVE. A plurality of micro-orders ①through ⑤, Ⓕ3, ⊗, ⊖, ⊖, ⊕, Ⓒ, and ⊜ are applied to the circuit elements. A circuit configuration in still another form of the present invention is represented by dotted line shown in FIG. 12.

Figure 13:
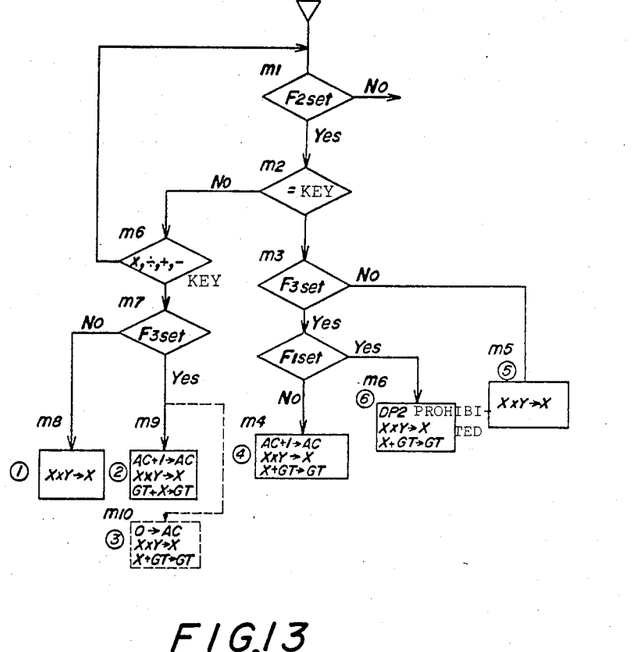
FIG. 13 is a flow chart representing operation by the circuit indicated in FIG. 12.

FIG. 13 shows a flow chart representing sum operations in the normal calculation and sum prohibiting operations in the abnormal calculation, both operations being controlled by the actuation of one of the function key switches.

The flow chart contains four kinds calculating routines as described below.

(1) Multiplication routine (m1→m2→m6→m7→m8):
This routine is directed for the purpose of conducting a multiplication, in particular, in a successive or chain calculation.

(2) Sum prohibiting routine in the sum mode (m1→m2→m6→m7→m9 (m10)):

(3) Normal calculation routine in the sum mode (m1→m2→m3→m4):

(4) Normal calculation routine in the non-sum mode (m1→m2→m3→m5):

The sum of some calculated results is obtained in routines (2) and (3) and, in addition, the sum is counted only in routine (3) with the result that the resultant is indicated in the sum display DP1.

Routine (2) is further explained with reference to FIG. 12. As the mode selection switch M is placed in the GT mode in the sum mode, the flip flop F3 is turned set through the AND gate A6. The micro-order (F3) is generated in the sum mode so that the contents of the X register are added to that of the GT register and so that the results are introduced to the GT register through the X register. The AND gate A4 is provided for controlling the generation of key information (ave) in response to the actuation of the average key AVE for obtaining an average value. When the normal calculation is not effected, the AND gate A4 is not conductive. Then the generation of the key information (ave) is prevented to thereby prevent the calculation for an average value.

In response to micro-order ⊗ produced by the actuation of the key switch ⊠, the flip flop F2 is turned set. In response to further micro-order ⊖, ⊖, or ⊕ produced respectively by the activation of the key switches ⊟, ⊟, or ⊞, it is turned reset. The flip flop F1 serves to prevent, with the help of the AND GATE A1, the contents of the counter AC from being indicated in the calculation-data display DP2. In response to the actuation of any of ⊠, ⊟, ⊞, and ⊟ key switches after the actuation of the multiplication key switch ⊠, the flip flop F1 is turned set. In terms of the generation of the micro-orders (F3) or ©, it is turned reset.

The micro-order (F3) is generated in the non-sum mode in the normal mode N. The mocro-order © is developed in response to the activation of the clear key switch. The addition circuit AD is response to micro-order ⊖ by the equal key switch for adding one to the counter AC through the AND gate A2. The micro-order ① through ⑤ are generated in the respective addresses m4, m5, m8, m9 and m10 in the each train of the routine for the purpose of controlling the registers in the register unit R.

For example, some normal calculations and abnormal calculation are carried out as follows:

| | |
|---|---|
| (1) A × B = C | GT mode |
| (2) D × E = F | |
| (3) G × H × I = J | |
| (4) K × L = M | |

In (1), routine m1→m2→m3→m4 is executed, so that the results C is stored in the X register and the GT register. The counter AC is operated as "AC+1→AC" so that it stores "1". In (2), as in the case with (1), routine m1→m2→m3→m4 is performed so that the results F are stored in the X register. The sum of C in (1) and F in (2) is stored in the GT register. The counter AC is increased to "2". The contents of the X register and the counter AC are respectively indicated in the sum display DP1 and the calculation-data display DP2.

In addition, the sum key switch GT is operated so that the contents of the GT register are transferred to the X register, with the result that the contents of the GT register can be indicated in the sum display DP1.

In (3), the actuation of key switches "GxH" selects step m1. In accordance with the actuation of the multiplication key ⊠, steps m2→m6 m9 are executed. In response to the actuation of key switches "GxHx", the flip flops F2 and F1 are turned set. The AND gate A1 is nonconductive. The reset output of the flip flop F1 is not present. The contents of the counter AC is prevented from being introduced into the calculating-data display DP2. In this manner step m9 is performed, with the result that the counter AC is counted up according to the actuation of the equal key switch and the GT register has the sum.

In place of step m9, step m10 is executed wherein through the AND gate A3 the counter AC is canceled and by the flip flop F1 the AND gate A2 is turned to be nonconductive. Therefore, the following sum is assumed to be invalid, so that the further counting up by the counter AC is prohibited. In this example, the calculation-data display DP2 is also prevented from indicating data, but, it may be possible that it continues to indicate null information of the counter AC.

In (3), the actuation of key switches "I=" is performed so that steps m1→m2→m3→m6 are executed. Since the flip flop F1 is placed in set conditions, the contents of the counter AC are prevented from being indicated. In another way, the counter AC may be canceled to refrain from counting further.

Thereafter, the GT mode is replaced by the normal mode N and then the GT mode is again selected. Alternatively, since the flip flop F1 is kept placed in set conditions until the clear operation is effected, steps m1→m2→m3→m6 are executed.

The voice pronunciation by the voice synthesizer of the synthetic-speech calculator of the present invention is carried out by providing the pronunciation of data stored in the X register and the GT register through the calculating unit CU by means of the voice control circuit VCC. The number of the sum calculation stored in the counter AC can be pronounced. For example, the following pronunciation by the English language or the corresponding Japanese language can be obtained.
(i) Item count twelve: or
(ii) The number of the sum calculation twelve When the count of the number of the sum calculation is valid, the condition is detected to generate the micro-order ② and ③ with the object that the following pronunciation is provided to inform the operator of the invalidity of the sum calculation, in English or the equivalent Japanese.
(i) Item is invalid. or
(ii) The number of the sum calculation is invalid.

When an average value of some normal calculation results by some calculation equations is supposed to be obtained, another type of pronunciation can be provided to inform the operator of the invalidity of the count for the number of the sum calculation. For this purpose, each time the average key AVE is actuated, the introduction of the key information by the average key AVE is prevented by the output signals from the flip flop F1. In addition, each time the average key AVE is operated, the AND gate A5 provides detection signals by the operation of the average key AVE. The detection signals cause the voice control circuit to operate the following pronunciation, in English or the equivalent Japanese language.
(i) Average is impossible.
(ii) Average is invalid. or
(iii) Mean value is invalid.

While only certain embodiments of the present invention have been described, it will be apparent to those skilled in the art that various changes and modifications may be made therein without departing from the spirit and scope of the invention as claimed.

What is claimed is:
1. A synthetic-speech calculator capable of developing audible sounds representative of a calculation being performed by said calculator, said calculator being in an initial condition prior to performing said calculation, said calculation utilizing a calculation equation as a function of at least one unit of calculation numerical data, comprising:

input means for introducing said calculation equation and said unit of calculation numerical data into said synthetic-speech calculator;

memory means connected to the input means for storing said calculation equation and said unit of calculation numerical data therein;

display means connected to said memory means for generating a visual display of said calculation equation and of said unit of calculation numerical data;

means for performing said calculation utilizing said calculation equation as a function of said calculation numerical data;

audible sound generating means connected to said memory means for generating audible sounds representative of said calculation equation as a function of said unit of calculation numerical data; and     playback means connected to said memory means and responsive to actuation of a key switch on said input means for repeating said calculation utilizing said calculation equation as a function of said unit of calculation numerical data and for repeating the generation of said audible sounds representative of the entire said calculation equation as a function of said unit of calculation numerical data;

wherein the display means further comprises means for indicating the number of calculation equations presently executing the calculation.

2. A sythetic-speech calculator for developing audible sounds representative of a calculation being performed by said calculator, said calculation involving the utilization of a plurality of calculation equations to produce a plurality of respective calculated results, comprising:

counting means for maintaining a count indicative of the sum of said calculated results produced by said calculation equations; and     means for generating an attention-producing presentation indicative of the invalidity of the count representative of the sum of said calculated results.

3. A synthetic-speech calculator capable of developing audible sounds representative of a calculation being performed by said calculator, said calculator being in an initial condition prior to performing said calculation, said calculation utilizing a calculation equation as a function of at least one unit of calculation numerical data, comprising:

input means for introducing said calculation equation and said unit of calculation numerical data into said synthetic-speech calculator;

memory means connected to the input means for storing said calculation equation and said unit of calculation numerical data therein;

display means connected to said memory means for generating a visual display of said calculation equation and of said unit of calculation numerical data;

means for performing said calculation utilizing said calculation equation as a function of said calculation numerical data;

audible sound generating means connected to said memory means for generating audible sounds representative of said calculation equation as a function of said unit of calculation numerical data;

playback means connected to said memory means and responsive to actuation of a key switch on said input means for repeating said calculation utilizing said calculation equation as a function of said unit of calculation numerical data and for repeating the generation of said audible sounds representative of the entire said calculation equation as a function of said unit of calculation numerical data; and     mode selection means for selectively changing the mode of generation of the audibly sounds between a first mode and a second mode,     each digit of the calculation equation as a function of the unit of calculation numerical data being audibly generated by said audible sound generating means when said synthetic-speech calculator is placed in said first mode by said mode selection means,     a group of digits forming a portion of the calculation equation as a function of the calculation numerical data being audibly generated while stating the relative portion of the digits within the group when said synthetic-speech calculator is placed in said second mode by said mode selection means.

4. A synthetic-speech calculator capable of developing audible sounds representative of a calculation being performed by said calculator, said calculator being in an initial condition prior to performing said calculation, said calculation utilizing a calculation equation as a function of at least one unit of calculation numerical data, comprising:

input means for introducing said calculation equation and said unit of calculation numerical data into said synthetic-speech calculator;

memory means connected to the input means for storing said calculation equation and said unit of calculation numerical data therein;

display means connected to said memory means for generating a visual display of said calculation equation and of said unit of calculation numerical data;

means for performing said calculation utilizing said calculation equation as a function of said calculation numerical data;

audible sound generating means connected to said memory means for generating audible sounds representative of said calculation equation as a function of said unit of calculation numerical data;

playback means connected to said memory means and responsive to actuation of a key switch on said input means for repeating said calculation utilizing said calculation equation as a function of said unit of calculation numerical data and for repeating the generation of said audible sounds representative of the entire said calculation equation as a function of said unit of calculation numerical data; and     means for selectively placing said synthetic-speech calculator in an automatic mode or a playback mode,     the audible sounds representative of said calculation equation as a function of said unit of calculation numerical data being automatically generated by the audible sound generating means following the completion of the introduction of the calculation equation and the unit of calculation numerical data into said synthetic-speech calculator when the synthetic-speech calculator has been placed in the automatic mode by the means for placing,     said audible sounds being generated by the audible sound generating means in response to each actuation of the playback means following the completion of the introduction of the calculation equation and the unit of calculation numerical data into said synthetic-speech calculator when the calculator has been placed in the playback mode by the means for placing.

5. The calculator according to claim 2, wherein the means for generating a presentation prevents the count of the sum of the calculated results from being indicated.

6. The calculator according to claim 2, wherein the means for generating a presentation causes the counting means to be reset.

7. The calculator according to claim 2, wherein the means for generating a presentation comprises a voice synthesizer for providing an audible presentation representative of the invalid count.

* * * * *